(12) United States Patent
Klaghofer et al.

(10) Patent No.: US 7,359,320 B2
(45) Date of Patent: Apr. 15, 2008

(54) METHOD FOR SUPPORTING QUALITY OF SERVICE FEATURES IN HETEROGENEOUS COMMUNICATIONS NETWORKS

(75) Inventors: Karl Klaghofer, Munich (DE); Harald Mueller, Gilching (DE); Heribert Müller, Eggenburg (AT); Juergen Totzke, Poing (DE)

(73) Assignee: Siemens Aktiengellschaft, Munich (DE)

(*) Notice: Subject to any disclaimer, the term of this patent is extended or adjusted under 35 U.S.C. 154(b) by 1028 days.

(21) Appl. No.: 10/191,796

(22) Filed: Jul. 10, 2002

(65) Prior Publication Data

US 2003/0012207 A1    Jan. 16, 2003

(30) Foreign Application Priority Data

Jul. 11, 2001   (DE)   ................ 101 33 648

(51) Int. Cl.
*G01R 31/08* (2006.01)
(52) U.S. Cl. .............. 370/230; 370/352; 370/401; 370/466
(58) Field of Classification Search .......... 370/467, 370/353; 379/93.07, 221.08
See application file for complete search history.

(56) References Cited

U.S. PATENT DOCUMENTS

| | | | |
|---|---|---|---|
| 6,275,574 B1* | 8/2001 | Oran .................. 379/201.01 |
| 6,693,912 B1* | 2/2004 | Wang .................. 370/401 |
| 6,832,254 B1* | 12/2004 | Scoggins et al. .......... 709/227 |
| 6,862,622 B2* | 3/2005 | Jorgensen .............. 370/351 |
| 6,947,385 B2* | 9/2005 | Havens ................ 370/236 |
| 7,002,919 B1* | 2/2006 | El-Sayed .............. 370/252 |
| 2001/0036176 A1* | 11/2001 | Girard ................ 370/352 |
| 2003/0002476 A1* | 1/2003 | Chung et al. ........... 370/352 |

FOREIGN PATENT DOCUMENTS

| | | |
|---|---|---|
| EP | 1100280 | 5/2001 |
| EP | 1111892 | 6/2001 |
| WO | WO00/77988 | 12/2000 |
| WO | WO001/35579 | 5/2001 |

OTHER PUBLICATIONS

Series H: Audiovisual and Multimedia Systems, Infrastructure of Audiovisual Services—Systems and Terminal Equipment for Audiovisual services, Packet-based Multimedia Communications Systems, ITU-T-Recommendation H. 323, Feb. 1998.

* cited by examiner

*Primary Examiner*—Doris H. To
*Assistant Examiner*—Ian N. Moore
(74) *Attorney, Agent, or Firm*—Staas & Halsey LLP

(57) ABSTRACT

The method is essentially carried out by a gateway device, which is logically divided up into a gateway controller and one or, if required, more user data gateways. Quality of service signaling is evaluated by the gateway controller and, depending thereon, quality of service information is transferred to a user data gateway. Specific quality of service properties of connection segments coming into and/or going out from the user data gateway are evaluated by the user data gateway and, depending thereon, a quality of service setting is carried out according to the transferred quality of service information.

18 Claims, 2 Drawing Sheets

METHOD FOR SUPPORTING QUALITY OF SERVICE FEATURES IN HETEROGENEOUS COMMUNICATIONS NETWORKS

CROSS REFERENCE TO RELATED APPLICATIONS

This application is based on and hereby claims priority to German Application No. 101 336 48.9 filed on Jul. 11, 2001, the contents of which are hereby incorporated by reference.

BACKGROUND OF THE INVENTION

Present-day communications systems, e.g. for voice, video, multimedia and/or data communications, frequently extend over a plurality of networks which may be based on different network technologies, e.g. different packet-switched or circuit-switched technologies. Here, it is not uncommon for individual networks of a large-scale communications system to be operated by network operators which are independent from one another, employing different, individual network operation strategies.

Different networks are frequently interconnected with the aid of network transit devices, referred to as "gateways", in order to transmit data across the networks. A particular function of a gateway of this type is to adapt different data transmission methods of different connected networks to one another.

An important property of data transmission, in particular during a communications connection, is "quality of service". The quality of service (QoS) of a data transmission may comprise different transmission and connection properties, e.g. transmission bandwidth, transmission speed and/or maximum or mean error rate or transmission delay.

Different methods are known, e.g. from ITU-T Recommendation H.323, for ensuring the quality of service of a communications connection. These methods, and the respective predefinable quality of service settings, are normally dependent on the network technology and the available transmission methods of a respective transport network. In a heterogeneous communications network extending over a plurality of different networks, network-specific methods for ensuring quality of service cannot readily adapt to one another across the networks, according to the currently known state of the art. Known methods for ensuring quality of service cannot normally be applied globally across heterogeneous communications networks of this type, or can only be applied if these methods and the associated quality of service settings are standardized across the entire communications network.

A potential object of the present invention is to indicate a method for cross-network support of quality of service features in heterogeneous communications networks.

The method is essentially implemented by a gateway device, i.e. a network transfer device, which is logically divided up into a gateway controller and one or, if necessary, more user data gateways. The use of a logically divided gateway device of this type, e.g. according to ITU-T Recommendation H.248, offers the advantage that the method can be very readily scaled to communications networks of different orders of magnitude, and is suitable in particular for heterogeneous, distributed network architectures. Whereas the gateway controller is used in particular for signaling evaluation, signaling processing and/or signaling conversion, user data in particular, e.g. voice data, video data, multimedia data and/or file data are transmitted and, if necessary, converted by the user data gateway.

Quality of service information, e.g. in the form of a quality of service message or a quality of service signal, is transferred by the gateway controller, depending on evaluated quality of service signaling to the user data gateway. Specific quality of service properties of connection segments coming into and/or going out from the user data gateway are evaluated by the user data gateway and, depending thereon, a quality of service setting is carried out according to the transferred quality of service information. For example, network-specific, interface-specific, connection-specific and/or quality of service type specific quality of service properties of the connection segments can be evaluated as quality of service properties.

The quality of service information can preferably be transferred by a protocol according to ITU-T Recommendation H.248, which is extended to include a quality of service information signaling element. Due to the extension, this signaling protocol which is particularly suitable for the communication of gateway components, can also be used to transfer quality of service information.

Alternatively, the quality of service information can be transferred according to the IETF standard by a "Media Gateway Control Protocol" (MGCP) which is extended to include a quality of service signaling information element.

According to an advantageous further development, the user data gateway can compare the quality of service properties of outgoing and incoming connection segments and, depending on the result of the comparison, can convert quality of service parameters allocated to these connection segments. In this way, for example, if the quality of service properties of an incoming connection segment of a connection differ from the quality of service properties of an outgoing connection segment of this connection, the quality of service parameters allocated to the incoming connection segment can be converted into the equivalent quality of service parameters for the outgoing connection segment. The conversion is preferably carried out in such a way that quality of service settings which are as similar as possible in terms of their effect are carried out for both connection segments. The conversion of the quality of service parameters depending on the comparison of the quality of service properties can be carried out by the user data gateway largely independently, i.e. without consultation with the gateway controller. No additional specific signaling is therefore required.

According to an advantageous embodiment, generic quality of service information can be transferred by the gateway controller to the user data gateway. Generic quality of service information refers in this context to information which is independent of the networks which transport user data, or which is at least not transport-network-specific. The transferred generic quality of service information is converted by the user data gateway depending on the connection-segment-specific quality of service properties into connection-segment-specific quality of service settings.

Instead of generic quality of service information, the gateway controller can also transfer specific quality of service information, which may, for example, be network-specific, interface-specific and/or quality of service type specific, to the user data gateway. The quality of service information conversion depending on the quality of service properties of the connection segments can be omitted in this case or replaced by a check to ascertain whether the specific quality of service information can be reconciled with the quality of service properties.

According to a further advantageous embodiment, the connection segments going out from the user data gateway can in each case be controlled by a specific data object which has quality of service parameters in the sense of an object-oriented program concept.

According to an additional advantageous further development, the gateway controller can retrieve connection-segment-specific quality of service properties from the user data gateway and can then transfer the quality of service information depending on the retrieved quality of service properties. The quality of service properties can preferably be retrieved before a connection is set up in order to negotiate the quality of service for the connection in advance depending on the available quality of service resources. Preliminary quality of service negotiation of this type is often referred to as the "look-ahead method".

According to an additional advantageous further development, further quality of service information can be transferred, depending on a quality of service specification, from the gateway controller to one or more connection end points, e.g. a terminal device for voice, video and/or multimedia communications or to a multimedia-enabled personal computer. The quality of service specification may be defined here e.g. by the system administration or by the evaluated quality of service signaling. Quality of service settings of the connection end point can be defined with reference to the user data gateway through the transfer of the further quality of service information to a connection end point.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
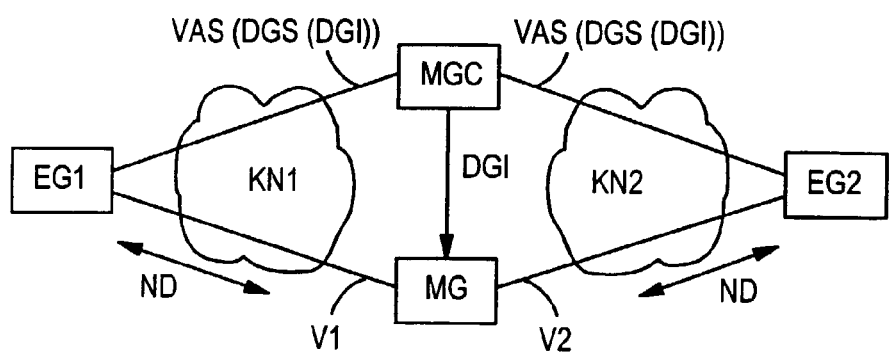
FIG. 1 shows a communications system with two communications networks connected via a logically separated gateway device.

Reference will now be made in detail to the preferred embodiments of the present invention, examples of which are illustrated in the accompanying drawings, wherein like reference numerals refer to like elements throughout.

FIG. 1 schematically shows a communications system in which different communications networks KN1 and KN2 are connected via a gateway device which is logically divided up into a gateway controller MGC and a user data gateway MG. The communications network KN1 may, for example, be an Internet-protocol-based network, for example a local area network for data-packet-based voice, video, multimedia and/or data communications. A packet-oriented communications network of this type for voice, video and/or multimedia communications is also frequently referred to as a VoP network (VoP: Voice/Video over Packet) or VoIP network (VoIP: Voice/Video over Internet Protocol). It is assumed for the present embodiment that the communications network KN2 differs from the communications network KN1 particularly in terms of the available quality of service features or quality of service mechanisms.

The gateway controller MGC and the user data gateway MG can preferably be designed according to ITU-T Recommendation H.248. A gateway controller of this type is also frequently referred to as a "Media Gateway Controller (MGC)" and a user data gateway of this type as a "Media Gateway (MG)". The gateway controller MGC can furthermore be combined with a "Signaling Gateway (SG)" according to H.248.

The gateway controller MGC essentially serves to convert call signaling between the communications networks KN1 and KN2. Conversely, the user data gateway MG essentially serves to convert user data between the communications networks KN1 and KN2. The signaling conversion is thus logically separated from the user data conversion, which is highly advantageous, particularly in heterogeneous, distributed network architectures. In particular, the signaling and user data can be routed via different paths.

Furthermore, a terminal device EG1 is connected to the communications network KN1 and a terminal device EG2 is connected to the communications network KN2. The terminal devices EG1 and EG2 may be designed, for example, as terminal devices for voice, media, multimedia and/or data communications, or as multimedia personal computers. The terminal device EG1 preferably forms a connection end point and the communications network KN1 preferably forms a VoIP network according to ITU-T Recommendation H.323.

In the present embodiment, a connection with a quality of service which is to be predefined is set up from the terminal device EG1 via the communications network KN1, the logically separated gateway device and the communications network KN2 to the terminal device EG2. During this connection set-up, connection set-up signaling VAS is carried out between the terminal device EG1 and the gateway controller MGC via the communications network KN1, and also between the gateway controller MGC and the terminal device EG2 via the communications network KN2. The connection set-up signaling VAS comprises quality of service signaling DGS, wherein quality of service information DGI is transmitted to the gateway controller MGC and from the latter to the terminal device EG2. The connection set-up signaling VAS may, for example, be carried out according to ITU-T Recommendation H.323 in conjunction with H.225. Alternatively, the SIP protocol (Session Initiation Protocol) according to IETF (Internet Engineering Task Force) can be used.

During the connection set-up, a user data connection is set up between the terminal devices EG1 and EG2, said connection having a connection segment V1 routed from the terminal device EG1 via the communications network KN1 to the user data gateway MG, and a connection segment V2 routed from the user data gateway MG via the communications network KN2 to the terminal device EG2. During the connection, user data ND are exchanged via the user data gateway MG between the terminal devices EG1 and EG2. Depending on the connection type or terminal device type, the user data ND may, for example, be voice, video, multimedia and/or file data.

The connection-specific quality of service signaling DGS contained in the connection set-up signaling VAS is identified by the gateway controller MGC and, if necessary, converted in transit between the communications networks KN1 and KN2. Furthermore, the quality of service information DGI transferred in the quality of service signaling DGS is evaluated by the gateway controller MGC. For the present embodiment, it is assumed that the quality of service information DGI is a generic quality of service requirement which is, in particular, independent of the connection segments V1 and V2, the underlying data transport protocols and the type or technology of the transport networks involved in the connection, in this case KN1 and KN2. One or more generic quality of service classes are identified by the quality of service information DGI for the connection which is to be set up. For example, a data transmission rate which is to be guaranteed can be predefined in this way by the quality of service information DGI. A data transmission rate of this type may be specified, for example, in RAS connection set-up messages according to ITU-T Recommendation H.225 in the "bandwidth details" parameter.

Depending on the evaluated quality of service information DGI, quality of service settings corresponding to the generic quality of service requirement can be carried out in the user data gateway MG in a consistent, connection-segment-specific manner. The logical and physical quality of service administration are separated due to the division of the generic and specific quality of service administration between the gateway controller MGC and the user data gateway MG. This is highly advantageous, particularly in heterogeneous and distributed network architectures.

In order to set the specific quality of service features, the generic quality of service information DGI is transferred from the gateway controller MGC to the user data gateway MG. The quality of service information DGI is preferably transmitted to the user data gateway MG by an H.248 protocol which is extended to include a quality of service information signaling element. The H.248 protocol can be extended by a quality of service module or "QoS package" (QoS: Quality of Service), which has properties for quality of service "commands" and for a "QoS descriptor".

Alternatively, the quality of service information DGI can also be transferred by other protocols which are suitable for data transmission between a gateway controller and a user data gateway, for example the "Media Gateway Control Protocol (MGCP)" according to the IETF standard, which must be extended accordingly to include a quality of service information signaling element.

As an alternative to the transfer of generic quality of service information, specific, e.g. transport-network-specific and/or connection-segment-specific, quality of service information can also be transmitted from the gateway controller MGC to the user data gateway MG. In this case, the transmission protocol used between the gateway controller MGC and the user data gateway MG must be extended to include corresponding, specifically designed quality of service modules with corresponding properties.

For adaptation of quality of service settings of the connection end points, in this case EG1 and EG2, to quality of service settings of the user data gateway MG, the gateway controller MGC can transmit one or more further generic or specific quality of service information elements (not shown) to the connection endpoints, in this case EG1 and EG2, or at least to one of these connection end points.

Figure 2:
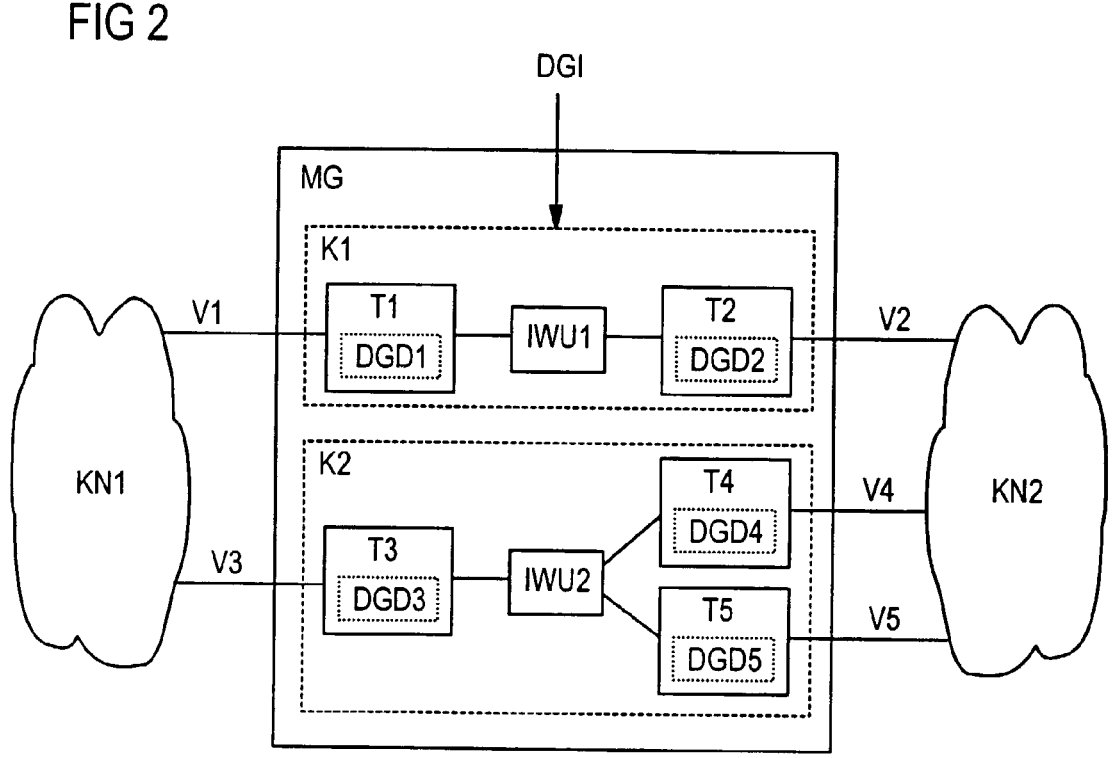
FIG. 2 shows a user data gateway as part of the gateway device.

FIG. 2 is a block diagram showing a detailed representation of the user data gateway MG connected to the communications networks KN1 and KN2. Along with the connection segments V1 and V2 routed via the communications network KN1 or KN2, FIG. 2 also shows further connection segments V3, V4 and V5 not shown in FIG. 1. Whereas the connection segment V3 feeds into the communications network KN1, the connection segments V4 and V5 feed into the telecommunications network KN2. A three-way conference circuit is implemented by the connection segments V3, V4 and V5.

As functional components, the user data gateway MG has various data objects in the sense of an object-oriented programming concept. The individual data objects are controlled by the gateway controller MGC through the transfer of command information, e.g. according to H.248. In particular quality of service settings of the data objects are controlled by quality of service information transferred from the gateway controller MGC.

In the present embodiment, the user data gateway MG has "terminations" T1, T2, T3, T4 and T5 and "contexts" K1 and K2 as data objects. Terminations and contexts can in each case be generated, controlled and deleted by the command information transferred from the gateway controller MGC.

The terminations form sources and sinks of data streams, whereby transmission parameters of a respective data stream are encapsulated within a respective termination. In particular, incoming and/or outgoing connection segments are terminated by the terminations. In the present embodiment, the termination T1 terminates the connection segment V1, the termination T2 terminates the connection segment V2, the termination T3 terminates the connection segment V3, the termination T4 terminates the connection segment V4 and the termination V5 terminates the connection segment V5.

A termination has descriptors, which in each case define specific properties of the termination. A descriptor may be implemented, for example, as a data structure or data object. The terminations T1, . . . T5 in each case have in particular a QoS descriptor DGD1, DGD2, DGD3, DGD4 and DGD5. Each quality of service descriptor DGD1, . . . DGD5 indicates specifically available quality of service features, specific quality of service properties, specific quality of service types, specific quality of service settings, specific quality of service options and/or specific quality of service parameter values of the relevant termination and therefore the relevant terminated connection segment V1, . . . , V5 or the relevant communications network KN1 or KN2. The specific quality of service properties of a termination may be defined administratively or by a setting protocol, and may be administered in an interface-specific manner. Thus, for example a quality of service support available in the connected transport network, and, where appropriate, its parameters can be defined by the quality of service descriptor of a termination; e.g. IEEE802.1 D/Q at layer 2 and DiffServ at layer 3 of the OSI reference model with corresponding codings for voice, video, multimedia and/or data connections. Both the quality of service type and the associated parameter values may differ for terminations connected to different communications networks.

In the present object model, a context, in this case K1 or K2, is an association of one or more terminations. A termination association of this type corresponds here to a connection. In other words, this means that connections in the present object model are mapped as a context with one or more terminations. In the present embodiment, the connection between the terminal devices EG1 and EG2 is mapped as a two-point connection onto the context K1 with the terminations T1 and T2 allocated to the two connection segments V1 and V2. The context K2 additionally shown in FIG. 2 comprises the terminations T3, T4 and T5 and thus corresponds to a 3-way conference circuit with the connection segments V3, V4 and V5. During a connection set-up, a termination is in each case set in a context corresponding to the connection structure which is to be set up. The allocation of terminations to contexts is initiated here by command information transferred from the gateway controller MGC, e.g. in the form of command messages according to H.248.

The quality of service settings in the quality of service descriptors DGD1, . . . , DGD5 of the terminations T1, . . . , T5 are initiated by the transfer of respective connection-specific quality of service information. In the present embodiment, the transferred quality of service information DGI refers to the connection between the terminal devices EG1 and EG2 with the connection segments V1 and V2. The quality of service information DGI therefore relates only to the context K1 and correspondingly initiates a relevant quality of service setting in the quality of service descriptors DGD1 and DGD2 of the terminations T1 and T2.

A relevant quality of service setting is carried out in such a way that the quality of service properties or quality of service features of the relevant connection segment V1 or V2 are initially evaluated with reference to the relevant quality of service descriptor DGD1 or DGD2. Following the evaluation of the connection-segment-specific quality of service properties, the quality of service settings are defined depending thereon according to the transferred quality of service information DGI. The quality of service requirement defined here by the quality of service information DGI is converted or mapped onto such connection-segment-specific quality of service features and quality of service parameters by which the quality of service requirement is fulfilled as precisely as possible. A mapping rule suitable for this purpose for mapping generic quality of service classes onto specific quality of service features and parameters can be derived, for example, from ITU-T Recommendation H.323 Annex N. The quality of service information DGI is autonomously converted or mapped onto connection-segment-specific quality of service settings by the user data gateway MG so that no further specific quality of service signaling is required.

The individual terminations T1 and T2 or T3, T4 and T5 of a relevant context K1 or K2 are interconnected by a conversion device IWU1 or IWU2. The conversion devices IWU1 and IWU2 may be implemented, for example, as program modules and/or by a signal processor.

User data, user data formats and/or user data codings which are to be transmitted via connections are converted or adapted as required by the conversion devices IWU1, IWU2 in transit between the communications networks KN1 and KN2. In particular, those conversions and adaptations are carried out which are determined by different quality of service properties or quality of service settings of the different connection segments V1 and V2, or V3, V4 and V5 of a connection.

A conversion or adaptation of this type is carried out, for example, in the context K1 in such a way that the quality of service properties and quality of service settings of the terminations T1 and T2 or connection segments V1 and V2 are initially compared with one another by the user data gateway MG during the connection set-up. If differences are identified here, a conversion or adaptation of quality of service parameters of the quality of service descriptors DGD1 and DGD2 and/or a conversion of the user data ND is required. The required conversion or adaptation is carried out autonomously by the conversion device IWU1 depending on the result of the comparison. A conversion of the user data ND may comprise an adaptation of specific user data codings or specific quality of service mechanisms in transit between the communications networks KN1 and KN2. If, on the other hand, no significant differences are identified in the comparison, the user data ND may also be forwarded transparently.

Figure 3:
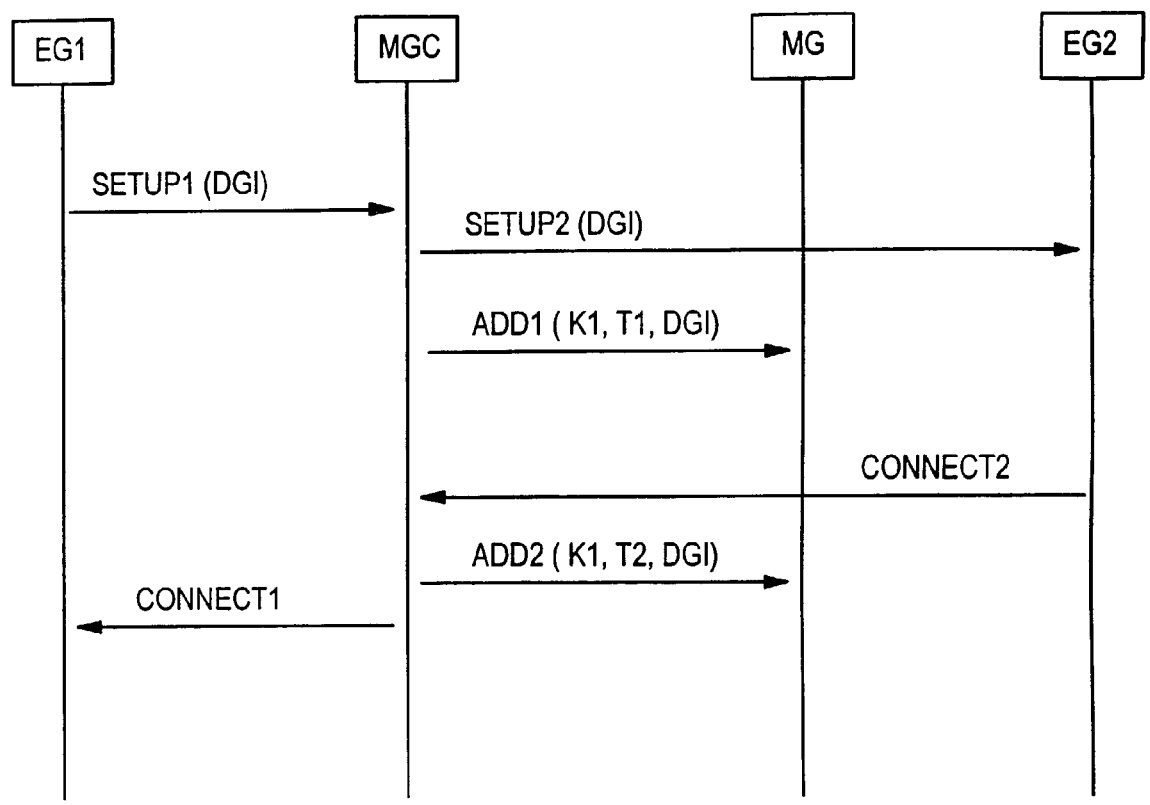
FIG. 3 shows a flowchart illustrating the signaling process when a cross-network connection with a predefined quality of service is set up.

FIG. 3 shows a flow chart illustrating the signaling process when a connection is set up between the terminal devices EG1 and EG2. The time access runs from top to bottom.

To initialize the connection set-up, a set-up message SETUP1, e.g. according to H.225, is transferred with the quality of service information DGI in the connection set-up signaling VAS and the quality of service signaling DGS from the terminal device EG1 to the gateway controller MGC. The quality of service information DGI is identified and evaluated by the gateway controller MGC. The gateway controller MGC then transfers a set-up message SETUP2 which is suitable for initiating the connection set-up in the communications network KN2 with the quality of service information DGI to the terminal device EG2. Furthermore, the gateway controller MGC transmits a command message ADD1, in which the context K1 and the terminations T1 are indicated, to the user data gateway MG. The command message ADD1 additionally contains the quality of service information DGI. The command message ADD1 is preferably transferred by an H.248 protocol which is extended to include a quality of service module.

By indicating the context K1 together with the termination T1, the termination T1 is set in the context K1. Quality of service settings are then carried out in the quality of service descriptor DGC1, as already explained above, depending on the transferred quality of service information DGI. For example, a quality of service type can be set here to DiffServ and a generic quality of service class identified by the quality of service information DGI can be allocated to a specific "DSCP" (Differentiated Services Code Point).

In response to the set-up message SETUP2, the terminal device EG2 transfers a connect message CONNECT2 to the gateway controller MGC in the connection set-up signaling VAS. The gateway controller MGC then transmits a command message ADD2 in which the context K1 and the termination T2 are indicated to the user data gateway MG. The command message ADD2 furthermore contains the quality of service information DGI. By indicating the context K1 together with the termination T2, the latter is set in the context K1 which already contains the termination T1. Quality of service settings are then carried out in the quality of service descriptor DGC2, as already explained above, depending on the transferred quality of service information DGI. Following the comparison of the quality of service properties and quality of service settings in the terminations T1 and T2, as already explained above, a conversion of quality of service parameters or the user data ND is initiated if necessary by the conversion device IWU1.

A connect message CONNECT1 is then transferred from the gateway controller MGC to the terminal device EG1, whereby the transmission of the user data ND between the terminal device EG1 and the terminal device EG2 is released.

The invention has been described in detail with particular reference to preferred embodiments thereof and examples, but it will be understood that variations and modifications can be effected within the spirit and scope of the invention.

What is claimed is:

1. A method for supporting quality of service features in a first and second communications networks connected with a gateway device, comprising:

logically dividing the gateway device into a gateway controller and a user data gateway, evaluating at the gateway controller, quality of service signaling, depending on the quality of service signaling, transferring quality of service information from the gateway controller to the user data gateway, evaluating at the user data gateway, connection-segment-specific quality of service properties of a first segment and a second segment of a connection, the first segment coming from the first communications network and terminating at the user data gateway and the second segment coming from the second communications network and terminating at the user data gateway, and depending on the connection-segment-specific quality of service properties, setting quality of service at the user data gateway, according to the quality of service information transferred from the gateway controller.

2. The method as claimed in claim 1, wherein the quality of service information is transferred as a signaling element in accordance with an H.248 protocol extended to include a quality of service information signaling element.

3. The method as claimed in claim 1, wherein the quality of service information is transferred as a signaling element in accordance with a "Media Gateway Control Protocol" according to the IETF standard, which is extended to include a quality of service information signaling element.

4. The method as claimed in claim 1, wherein traffic enters the gateway device on an incoming connection segment, traffic exits the gateway device on an outgoing connection segment, the quality of service properties of the outgoing and incoming connection segments are compared by the user data gateway and quality of service parameters allocated to the outgoing and incoming connection segments are converted depending on the result of the comparison.

5. The method as claimed in claim 1, wherein generic quality of service information is transferred from the gateway controller to the user data gateway, and the generic quality of service information is converted by the user data gateway into settings for the quality of service depending on the connection-segment-specific quality of service properties.

6. The method as claimed in claim 1, wherein the connection segments terminate at specific data objects within the user data gateway, and each specific data object controls quality of service parameters for traffic exiting the specific data object via one of the connection segments.

7. The method as claimed in claim 1, wherein connection-segment-specific quality of service properties are retrieved by the gateway controller from the user data gateway, and the quality of service information is transferred to the user data gateway depending on the quality of service properties retrieved by the gateway controller.

8. The method as claimed in claim , wherein the quality of service signaling is received at the gateway controller from a connection end point, quality of service information is also transferred from the gateway controller to the connection end point depending on a quality of service specification of the user data gateway.

9. The method as claimed in claim 1, wherein the quality of service signaling is carried out in accordance with ITU-T Recommendation H.323.

10. The method as claimed in claim 1, wherein the quality of service signaling is carried out in accordance with the "Session Initiation Protocol" according to IETF.

11. The method as claimed in claim 3, wherein traffic enters the gateway device on an incoming connection segment, traffic exits the gateway device on an outgoing connection segment, the quality of service properties of the outgoing and incoming connection segments are compared by the user data gateway and quality of service parameters allocated to the outgoing and incoming connection segments are converted depending on the result of the comparison.

12. The method as claimed in claim 11, wherein generic quality of service information is transferred from the gateway controller to the user data gateway, and the generic quality of service information is converted by the user data gateway into settings for the quality of service depending on the connection-segment-specific quality of service properties.

13. The method as claimed in claim 12, wherein the connection segments terminate at specific data objects within the user data gateway, and each specific data object controls quality of service parameters for traffic exiting the specific data object via one of the connection segments.

14. The method as claimed in claim 13, wherein connection-segment-specific quality of service properties are retrieved by the gateway controller from the user data gateway, and the quality of service information is transferred to the user data gateway depending on the quality of service properties retrieved by the gateway controller.

15. The method as claimed in claim 14, wherein the quality of service signaling is received at the gateway controller from a connection end point, quality of service information is also transferred from the gateway controller to the connection end point depending on a quality of service specification of the user data gateway.

16. The method as claimed in claim 15, wherein the quality of service signaling is carried out in accordance with ITU-T Recommendation H.323.

17. The method as claimed in claim 16, wherein the quality of service signaling is carried out in accordance with the "Session Initiation Protocol" according to IETF.

18. A gateway device, comprising:

a user data gateway;

a gateway controller to receive quality of service signaling and transfer quality of service information to the user data gateway based on the quality of service signaling; and terminals provided in the user data gateway to receive a first connection segment coming from a first communications network and a second connection segment coming from a second communications network and terminating at the user data gateway, such that traffic entering the user data gateway on the first connection segment exits the user data gateway on the second connection segment, the user data gateway setting quality of service parameters for traffic exiting the user data gateway based on the quality of service information received from the gateway controller and based on quality of service parameters associated with traffic entering the user data gateway from the first and second segments.

* * * * *